INVENTOR
HILMAR SCHÖNEMEYER
HERBERT SIEGEL - HELMUT WILLRETT
BY [signature]
ATTORNEY

CLASS OF SERVICE TELEPHONE SYSTEM

Filed June 16, 1964

INVENTOR
HILMAR SCHÖNEMEYER
HERBERT SIEGEL- HELMUT WILLRETT
BY
ATTORNEY

United States Patent Office 3,350,507
Patented Oct. 31, 1967

3,350,507

CLASS OF SERVICE TELEPHONE SYSTEM

Helmut Willrett, Ditzingen, Sommerhalde, Hilmar Schönemeyer, Ditzingen, and Herbert Siegel, Munchingen, near Stuttgart, Germany, assignors to International Standard Electric Corporation, New York, N.Y., a corporation of Delaware Filed June 16, 1964, Ser. No. 376,304
Claims priority, application Germany, June 25, 1963, St 20,773
3 Claims. (Cl. 179—18)

ABSTRACT OF THE DISCLOSURE

The input of a diode matrix is selectively marked according to the directory number dialled by a calling subscriber, a potential then appearing at the matrix output according to the connections of diodes at the matrix crosspoints. Responsive thereto, the output potential tells the system how to route a connection to the called line. However, a class marking from a calling line may selectively operate any one of several relays to rearrange the matrix output connections and thereby modify the route instructions.

This invention relates to automatic telephone systems and more particularly to systems for giving class of service indications in quasi-electronic networks.

Telephone switching networks generally provide means for interconnecting two or more subscribers. These subscribers may be in the same local area, they may be in the same nation, or they may be located in different nations. Some subscribers may be given restricted service while other subscribers may be given special service. Sometimes, the call is extended over a direct path. Other times, as during national disasters, the call is extended over an alternate routing path.

Accordingly, an object of the invention is to provide facilities for giving class of service indications. Another object of this invention is to provide translators and registers for giving right-of-way signals.

More specifically, an object of this invention is to provide means for allowing or barring calls, depending upon the class of service given.

Figure 1:
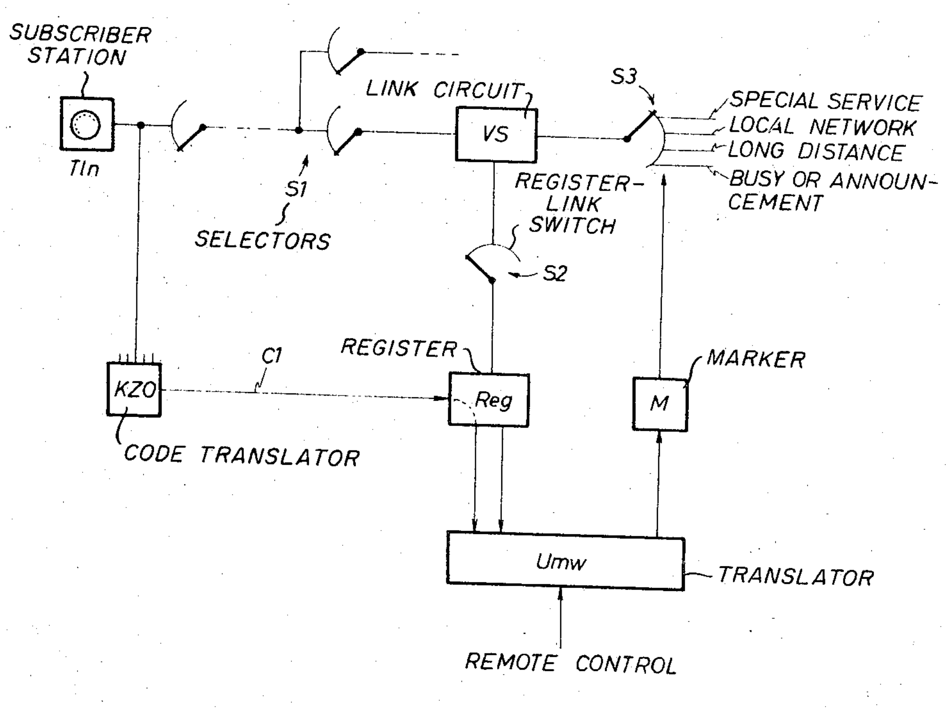
Figure 2:
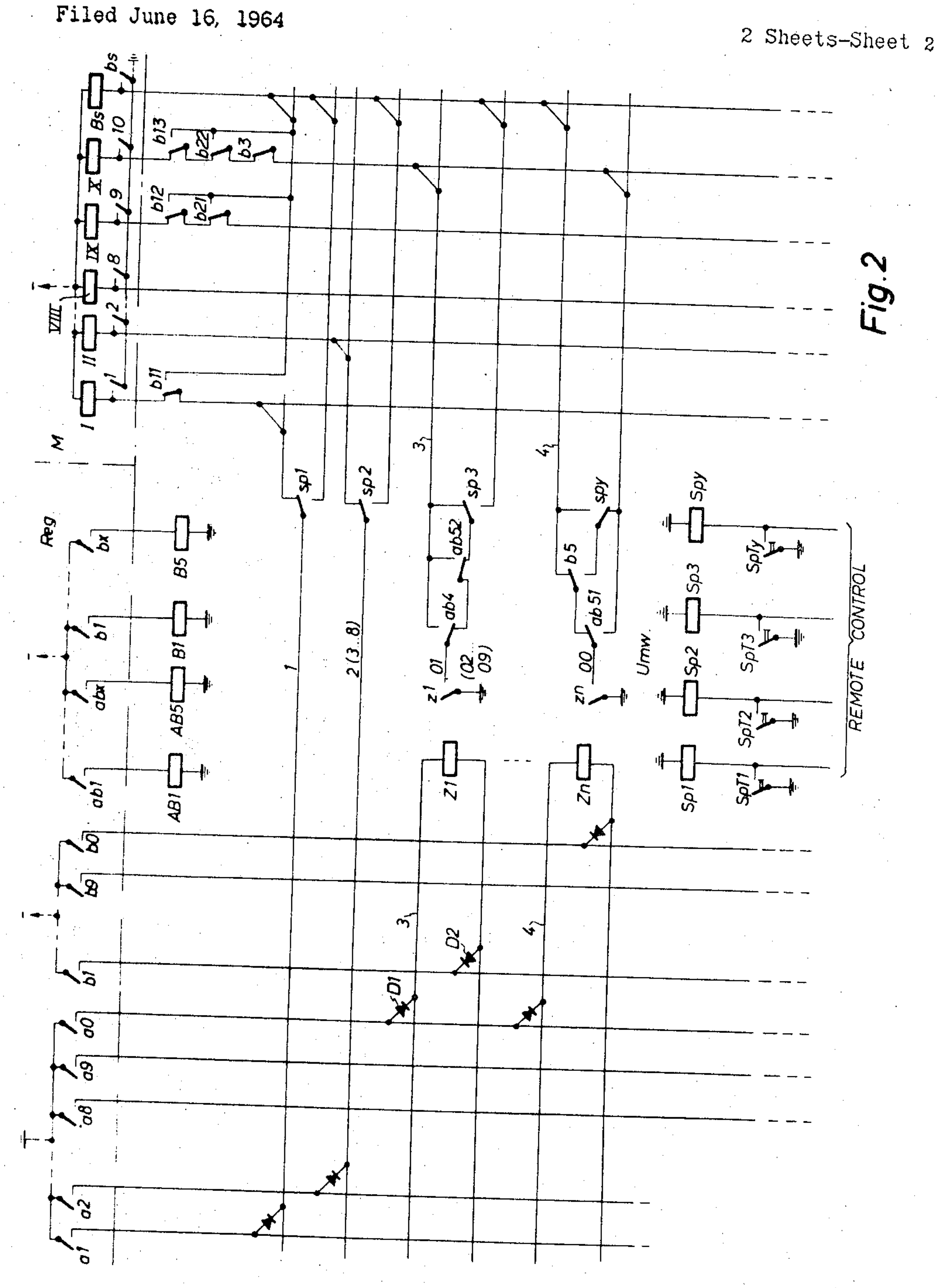

The above mentioned and other features of this invention and the manner of obtaining them will become more apparent, and the invention itself will be best understood by reference to the following description of an embodiment of the invention taken in conjunction with the accompanying drawings, in which:

FIG. 1 is a block diagram showing a portion of a switching network incorporating the principles of the invention; and FIG. 2 is a brief showing of the pertinent parts of the translator.

FIG. 1 includes a subscriber station T1*n*, a coding translator KZO, a register REG, a translator U*mw*, a marker M, a link circuit VS, and various accessing switches. The coding translator KZO is a device for sending a signal which represents the class of the calling subscriber.

When a calling subscriber T1*n* (FIG. 1) lifts his handset, he is connected with an available connecting link VS through the preceding selectors S1. An available register REG has already been connected to link VS via switch S2. Simultaneously, the class of service of the calling subscriber is determined by the "coding translator" KZO. Responsive thereto, a class of service signal is transmitted to the register REG via connection C1. From there the signal is forwarded to the translator U*mw* together with the call direction information (i.e. the dial information which the calling subscriber has stored in the register). As soon as this information is sufficient for the translation, suitable control signals are forwarded from the translator U*mw* to the marker M, depending on said two information items. These control signals include a blocking order which either enables the desired call or which initiates the emission of a busy signal. If, instead of the busy signal, the calling subscriber may be given a call service, the marker M initiates the setting of the selectors S3 following the connecting link VS.

The code identifying translator KZO interrogates for each outgoing and each terminating connection. This involves comparing the called number with the category of the calling subscriber lines. That is the translator KZO looks at the "code identification" which the calling subscriber possesses. This interrogation of the code identification is not shown here because it is known, per se. In addition, the code translator KZO provides such code identifications, as:

Subscriber billing rate,
Party line service,
Through dialing service,
Prepayment coin station,
Internal detour for information service,
Call answering service, intercepting facility, etc.

The two classes of service which are most important in this invention are:

(1) The right-of-way for telephone traffic to predetermined routes or directions.
(2) Exceptional right-of-way when certain destinations are blocked as during national disasters.

FIG. 2 is divided into three parts by means of dot-dashed lines. A portion of the register REG appears in the upper left-hand corner, the marker M in the upper right-hand corner, and the translator in the remaining part of the figure. The principal item in the translator is a diode matrix. For purposes of assigning reference characters to the drawing, the following table will identify the functions carried out by the indicated relays.

B1—Local traffic (1st digit 2 . . . 8)
B2—Local traffic+special services (1st digit 1 . . . 8)
B3—Local traffic+special services+regional traffic (1st digit 1 . . . 9)
B4—National traffic (1st digit . . . 9, 01 . . . 09)
B5—National traffic+traffic to foreign countries (1st digit 1 . . . -9).

Thus the relays B1 and B5, shown in the upper center of the drawing, perform the function of indicating "local traffic" and "national traffic+traffic to foreign countries," respectively. Relays B2, B3, B4 (not shown) are also provided to indicate their function.

In addition to these "B" relays, any number of other "AB" relays may be provided to accommodate exceptional cases.

When the register REG is ready for translation, it closes the contacts shown in the upper left-hand corner, in any well known means. The first stored digit causes one of ten contacts *a*1 . . . *a*0 to close. The second digit causes one of ten contacts *b*1 . . . *b*0 to close. Thus, the first two digits of the office number or area code of the called number are sent into the translator. In addition, the register closes one of the contacts *ab*1 . . . *abx*; *b*1 . . . *bx* to operate a correspondingly designated relay in the translator for indicating the nature of service given to the calling line.

When a "1" is dialed as first digit, contacts *a*1 close and it is evaluated in the first horizontal line of the diode matrix. Relay I in the marker M is operated for all subscriber groups, except group B1. That is, if the calling subscriber is entitled only to local service, the code from the translator KZO causes the register REG to operate relay B1. Contact *b*11 opens to switch the line to operate relay B*s* in the marker. This relay B*s* indicates that either a busy signal is applied to the called line or a call service outlet is connected thereto.

In case a call should be blocked, a relay S*p*1 is operated through either push-button S*p*T1 or a remote control device. Consequently, contact *sp*1 is in an operative position, and the direction I is blocked for all subscribers. That is, any time when contacts *a*1 close, a potential feeds through line 1, contacts *sp*1 (operated), and the winding of relay B*s*, and the subscriber lines receive busy signals.

If the first digit is "2," contacts *a*2 close.

The potential on the horizontal line 2 is switched, and all subscribers have access to the direction II relay II. In case of blocking, relay *Sp*2 operates and the direction relay II is blocked for all subscribers, and the subscriber lines receive busy signals. In like manner, any other direction relay III . . . VIII may be operated on any digit.

The potential on the third horizontal line 3 is switched for the first two digits 01. (The lines for the digits 02 to 09 are not shown but are connected correspondingly.) For example, if the first two digits are 01, contacts *a*0 and *b*1 operate to complete a circuit through diodes D1, D2 and the winding of relay Z1. This closes contacts *z*1 and marks conductor 3. With the contacts in the position shown, relay X operates via contacts *z*1, *ab*4, *ab*52, s*p*3 normal, *b*3, *b*22, and *b*13—also all normal. This means that the call may be completed in the direction "X." However, only the subscribers of the classes B4, B5, AB4 and AB5 have access to the direction X, because the contacts *b*13, *b*22 and *b*3 switch over to block operation of relay X and to cause operation of relay B*s*.

In case of blocking via relay S*p*3, only the subscribers of the class AB4 and AB5 have access to the direction X, because the contacts *ab*4 and *ab*52 apply the signal potential on the fourth horizontal to the marker, independently of the blocking contact *sp*3.

The potential on the fourth horizontal line 4 is switched for the digits 00 when relay Z*n* operates. If these digits are dialed, only the subscribers of the classes B5 and AB5 have access to the direction X. In case of blocking via relay S*py*, only the subscribers of the group AB5 have access to said direction.

From the foregoing examples it may be gathered that the translator can sometimes initiate a marking after the first digit has been dialed and other times only after the second digit has been dialed.

It is also possible to subdivide the blocking possibilities furthermore, e.g. to block certain parts of a destination area or trunk lines or code prefix routes, in combination with the class of service markings.

While the principles of the invention have been described above in connection with specific apparatus and applications, it is to be understood that this description is made only by way of example and not as a limitation on the scope of the invention.

We claim:

1. In a telephone system for serving a plurality of different classes of subscriber lines, the combination comprising means for receiving and storing the digits which identify a called subscriber line, means for detecting the class of the calling subscriber line and giving an identification of said class, a diode matrix translator, the diodes of said matrix being coupled across the crosspoints of said matrix according to called number information, means for selectively marking a matrix inlet according to at least one of said stored digits for selectively forwarding a direction of call signal, means responsive to said class of line identification for selectively modifying the effect of said matrix marking to enable or block a connection according to said direction of call signal, and means responsive to said matrix marking for either enabling or blocking the extension of a call.

2. The system of claim 1 wherein said modifying means selectively utilizes the matrix marking to block the extension of said call.

3. The system of claim 1 and means for redirecting the marking within said matrix to send a busy signal when said call is blocked.

References Cited

UNITED STATES PATENTS 2,775,648 12/1956 Newstedt -------- 179—18(.2)

KATHLEEN H. CLAFFY, *Primary Examiner.*

WILLIAM C. COOPER, *Examiner.*